Aug. 19, 1952     J. J. OSPLACK     2,607,175
METHOD OF MAKING PRECISION GEARS
Filed Feb. 28, 1946
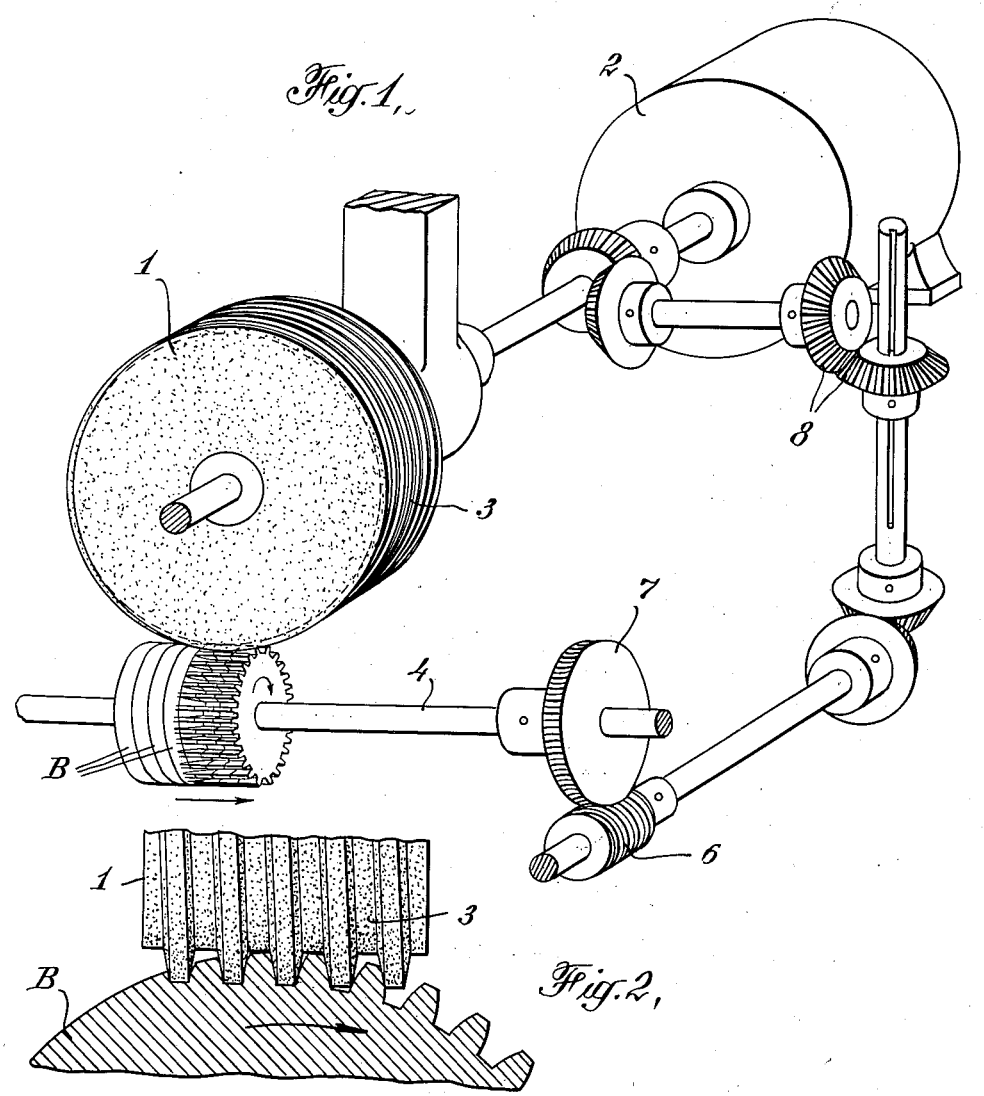
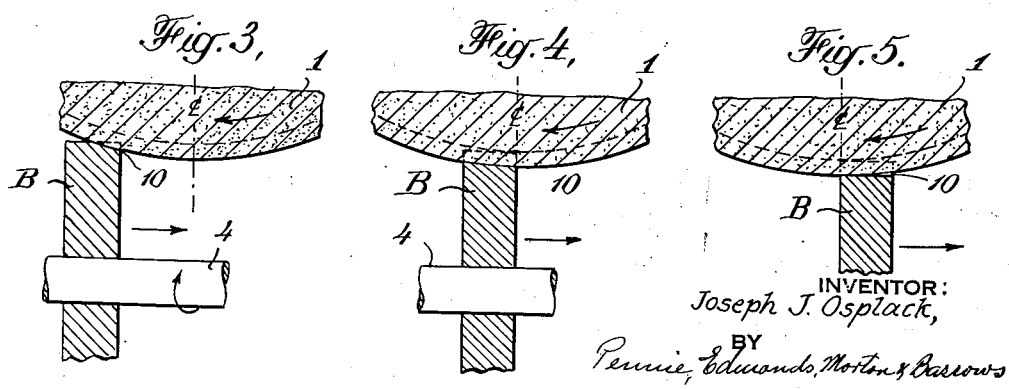
INVENTOR:
Joseph J. Osplack,
BY
Pennie, Edmonds, Morton & Barrows
ATTORNEYS Patented Aug. 19, 1952

2,607,175

UNITED STATES PATENT OFFICE 2,607,175

METHOD OF MAKING PRECISION GEARS

Joseph J. Osplack, Detroit, Mich., assignor to Vinco Corporation, Detroit, Mich., a corporation of Michigan Application February 28, 1946, Serial No. 650,831

8 Claims. (Cl. 51—287)

This invention relates to the method of making precision gears whereby gears of this type may be made on a quantity production basis within manufacturing tolerances heretofore obtainable only by methods involving expensive hand-finishing operations on the individual gears. Such hand-finished gears have heretofore, because of their cost, been restricted in their use to high priced precision instruments and like apparatus and to master gears for use as standards in the manufacture of gears on a quantity production basis.

By my improved method of manufacture gears having relatively small teeth may be produced in quantity with accurately spaced, accurately sized teeth of true involute shape within manufacturing tolerances less than .0005 in. (5 ten-thousandths of an inch).

My improved method may be used for making either "hard" or "soft" gears. The term "hard gears" is understood to mean gears wherein the gear, after it is shaped by machining or otherwise, is hardened by a heat-treating process. Such gears have usually a tooth surface hardness of above 35 "Rockwell C." The term "soft gears" designates a gear wherein there is no additional hardness imparted to the metal after shaping the gears. Such gears have a tooth surface hardness usually of less than 35 "Rockwell C." This particular hardness is in no sense critical but merely represents the present-day usual upper limit of hardness to be found in gears which are not hardened after machining.

My improved method of gear manufacture consists essentially in grinding the gear teeth directly and continuously into the perimeter of the gear blank by means of a gear-grinding machine operating on the hobbing principle, that is, a grinding machine wherein the abrasive wheel has on its perimeter a continuous helical thread of correct pitch and cross section to generate the teeth to be ground by a hobbing action as the blank is continuously rotated in synchronism with the abrasive wheel. Such machines have heretofore been proposed for use in finishing the tooth surfaces of gears wherein the teeth were previously formed by the customary tooth-cutting methods. A machine of this type is shown in the patent to Olson, No. 1,613,830, granted January 4, 1927.

I have discovered that with a machine operating on the same principle as the machine described in the above mentioned patent, the gear teeth may be ground directly into the gear blank and that such gears will be accurate in tooth formation, tooth spacing and surface finish to a degree heretofore obtainable only by the hand-finishing method employed in the manufacture of master gears.

In carrying out my improved method the gear blank is finished to the desired shape and dimensions. If a hard gear is to be made the gear blank is hardened after being shaped. Any method of hardening may be employed, but in any event the hardening should extend to a point below the surface of the perimeter greater than the height of the tooth to be formed. The gear blank may if desired be made slightly oversize and then finished after hardening by grinding to exact dimensions to take care of any distortion of the metal that may occur during the hardening operation. When soft gears are produced the hardening step is omitted.

The gear blanks are placed in the grinding machine and the teeth are continuously ground directly into the perimeter of the blank. In this grinding operation it is essential that the abrasive wheel and the gear blank be rotated at exactly the correct relative speeds. It is also essential that the helix or thread on the periphery of the abrasive wheel be accurately dressed to exact dimensions and that the blank or blanks to be ground be accurately and progressively advanced with respect to the abrasive wheel until the teeth are ground to the desired depth. I have designed and built a grinding machine wherein fine pitch gears of two inches pitch diameter with ninety-six teeth have been manufactured one at a time to an accuracy within the above mentioned tolerances at the rate of ten gears per hour.

In the accompanying drawings I have illustrated diagrammatically the essential elements of a machine for carrying out my process. The construction of my improved machine above referred to will be disclosed in a companion application, to which reference will be made.

In the drawing:

Fig. 1 is a schematic perspective showing the essential elements of a machine for carrying out my improved method;

Fig. 2 is a sectional view on an enlarged scale; and

Figs. 3, 4 and 5 are diagrammatic views showing the progress of the grinding operation when several gears are ground at one time.

I will first describe briefly the parts of the hobbing grinder shown in the drawing. The abrasive wheel 1 of the hobbing grinder is continuously driven from a suitable source of power represented by the motor 2. The abrasive wheel 1 has formed on its periphery a continuous helical ridge of trapezoidal cross-section indicated at 3. Also driven from the motor 2 in accurate timed relation with the abrasive wheel 1 (by means of a suitable gear train) is a shaft 4 on which the gear blanks B are mounted for grinding.

The speed ratio of the wheel 1 and shaft 4 is such that the periphery of the blank at a point corresponding to the pitch diameter of the gear to be ground advances during one complete revolution of the abrasive wheel a distance equal to the distance between the mid points of adjacent threads of the abrasive helix and the gearing for rotating the shaft 4 is designed so that the gear train may be readily altered, for example, by changing the worm 6 and worm gear 7. Also, of course, the shaft 4 must be adjustable toward and away from the surface of the abrasive wheel in accordance with the diameter of the blank to be ground. This adjustability is indicated by the sliding keyway connection between gears 8 of the train and its driving shaft.

The gear blanks which in the example illustrated consist of flat circular disks of a diameter equal to the overall diameter of the gear, are assembled on the shaft 4 in axial alignment and held together by appropriate means, not shown, to form in effect a single blank of cylindrical contour. The stack of blanks are supported on the shaft 4 for rotation with the shaft, but for axial movement independent of the shaft, and in the machine above referred to means are provided for slowly moving the blanks along the shaft 4 as indicated by the arrow in Fig. 1, so that the successive blanks will be brought into grinding relation with the periphery of the abrasive wheel.

The rate of movement of the blanks across the grinding face of the abrasive wheel determines the rate at which the metal is ground away to form the gear teeth and will be varied in accordance with the character of the abrasive wheel and the hardness of the metal to be ground.

Figs. 3, 4 and 5 illustrate the manner in which the formation of the teeth progresses as the block of gears is shifted slowly across the grinding face of the abrasive wheel. The abrasive thread on the periphery of the abrasive wheel first engages the outer edge of the end blank of the group supported on the shaft 4 and as the shaft is continuously rotated while the blanks are continuously advanced slowly along the shaft 4, there will be produced in the outer circumferential edge of the endmost blank upon the first complete revolution of the group of blanks a series of notches as indicated at 10, corresponding with the spaces between the gear teeth to be formed. With each successive rotation of the shaft 4 the notches are ground deeper until the full depth between the teeth is reached and at the same time, by means of the rolling action between the blanks and the side faces of the helical rib or thread of the abrasive wheel an involute curve will be generated on the driving faces of the teeth as illustrated in Fig. 2. This figure shows the generation of the gears which would take place were the gear blanks not shifted axially during the grinding operation as above described. The same ultimate shaping of the teeth takes place when the blanks are shifted axially as described, but of course by small increments through a number of successive revolutions of the blank instead of during a single revolution as would be the case were the grinding effected without shifting the gear blanks.

When a single blank is ground instead of a group of blanks, as is sometimes necessary, particularly when the gear is to have an integral hub or pivot shaft, the same procedure will be followed except, of course, that the movement of the blank across the face of the grinding wheel will be limited in extent to the thickness of the single gear to be ground.

It will be understood that the apparatus herein disclosed is shown merely by way of example and that any other suitable apparatus may be employed for carrying my improved method into effect.

It will also be understood that the invention herein disclosed is not limited to the precise steps recited in the specific examples given, but may be variously modified within the scope of the appended claims.

I claim:

1. The method of manufacturing gears which consists in shaping a blank to the desired configuration and final over all dimensions of the finished gear, driving said blank in predetermined timed relation to and in contact with a grinding wheel, and forming the teeth directly in the periphery of the blank by a continuous grinding operation which removes material filling the interteeth spaces in small successive increments from successive spaces thus insuring a substantially uniform progression in material removal from all the spaces.

2. The method of manufacturing gears which consists in shaping circular blanks to the final over all diameter of the finished gears, assembling a plurality of such blanks in axial alignment, driving the bank of blanks thus formed in predetermined timed relation to and in contact with a grinding wheel, and forming the teeth directly in the periphery of the blanks by a continuous grinding operation by removing the material filling the interteeth spaces in small successive increments from successive spaces thus insuring a substantially uniform progression in material removal from all the spaces.

3. The method of manufacturing gears which consists in shaping circular blanks to the final over all diameter of the finished gears, assembling a plurality of such blanks in axial alignment, driving the bank of blanks thus formed in predetermined timed relation to and in contact with a hobbing grinder, and then continuously generating the gear teeth in the periphery of the assembled blanks by the action of the hobbing grinder while shifting the bank of blanks axially to bring each of them into grinding relation with the grinder.

4. The method of manufacturing gears which consists in shaping a blank to the desired configuration and final over all dimensions of the finished gear, hardening the blank in such manner that the hardening around the periphery of the blank extends to a depth greater than the depth of the teeth of the finished gear, driving said blank in predetermined timed relation to and in contact with a grinding wheel, and forming the teeth in the hardened periphery of the blank by a continuous grinding operation which removes material filling the interteeth spaces in small successive increments from successive spaces thus insuring a substantially uniform progression in material removal from all the spaces.

5. The method of manufacturing gears which consists in shaping circular blanks to the final over all diameter of the finished gears, hardening the blanks in such manner that the hardening around the periphery of the blanks extends to a depth greater than the depth of the teeth of the finished gears, assembling a plurality of such blanks in axial alignment, driving the bank of blanks thus formed in predetermined timed relation to and in contact with a grinding wheel, and forming the teeth in the hardened periphery of the blanks by a continuous grinding operation which removes material filling the interteeth spaces in small successive increments from successive spaces thus insuring a substantially uniform progression in material removal from all the spaces.

6. The method of manufacturing gears which consists in shaping circular blanks to the final over all diameter of the finished gears, hardening the blanks in such manner that the hardening around the periphery of the blanks extends to a depth greater than the depth of the teeth of the finished gears, assembling a plurality of such blanks in axial alignment, driving the bank of blanks thus formed in predetermined timed relation to and in contact with a hobbing grinder, and then continuously generating the gear teeth in the periphery of the assembled blanks by the action of the hobbing grinder while shifting the bank of blanks axially to bring each of them into grinding relation with the grinder.

7. The method of manufacturing gears which consists in shaping a blank to the desired configuration and of dimensions slightly greater than the dimensions of the finished gear, hardening the blank in such manner that the hardening around the periphery of the blank extends to a depth greater than the depth of the teeth of the finished gear, shaping the hardened blank by a grinding operation to the required dimensions for the finished gear, driving said blank in predetermined timed relation and in contact with a grinding wheel, and forming the teeth directly in the periphery of the hardened blank by a continuous grinding operation which removes material filling the interteeth spaces in small successive increments from successive spaces thus insuring a substantially uniform progression in material removal from all the spaces.

8. The method of manufacturing gears which consists in shaping a blank to the desired configuration and of dimensions slightly greater than the dimensions of the finished gear, hardening the blank in such manner that the hardening around the periphery of the blank extends to a depth greater than the depth of the teeth of the finished gear, shaping the hardened blank by a grinding operation to the required dimensions for the finished gear, driving said blank in predetermined timed relation to and in contact with a hobbing grinder, and then continuously generating the gear teeth in the hardened periphery of the blank by the action of the hobbing grinder.

JOSEPH J. OSPLACK.

REFERENCES CITED

The following references are of record in the file of this patent:

UNITED STATES PATENTS

| Number | Name | Date |
| --- | --- | --- |
| 1,842,538 | Burgess | Jan. 26, 1932 |
| 2,385,650 | Rickenmann | Sept. 25, 1945 |
| 2,395,544 | Galloway | Feb. 26, 1946 |
| 2,424,191 | Rickenmann | July 15, 1947 |